US011747428B2

United States Patent
Chanal et al.

(10) Patent No.: US 11,747,428 B2
(45) Date of Patent: Sep. 5, 2023

(54) CORNER SENSOR FOR A MOTOR VEHICLE

(71) Applicant: Continental Automotive GmbH, Hannover (DE)

(72) Inventors: Sébastien Chanal, Toulouse (FR); Sylvain Godet, Toulouse (FR); Stéphane Billy, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 394 days.

(21) Appl. No.: 17/171,308

(22) Filed: Feb. 9, 2021

(65) Prior Publication Data
US 2021/0255272 A1 Aug. 19, 2021

(30) Foreign Application Priority Data

Feb. 13, 2020 (FR) ..................................... 2001404

(51) Int. Cl.
*G01S 3/48* (2006.01)
*G01S 3/04* (2006.01)
*G01S 3/74* (2006.01)
*H01Q 1/32* (2006.01)
*G01S 3/18* (2006.01)
*G01S 5/04* (2006.01)

(52) U.S. Cl.
CPC ................ *G01S 3/48* (2013.01); *G01S 3/043* (2013.01); *G01S 3/18* (2013.01); *G01S 3/74* (2013.01); *G01S 5/04* (2013.01); *H01Q 1/3283* (2013.01)

(58) Field of Classification Search
None
See application file for complete search history.

(56) References Cited

U.S. PATENT DOCUMENTS

| 3,971,020 A * | 7/1976 | Howard ................ G01S 13/426 |
| | | 342/123 |
| 6,377,213 B1 * | 4/2002 | Odachi .................... G01S 3/48 |
| | | 342/383 |

(Continued)

FOREIGN PATENT DOCUMENTS

| JP | 61284680 A | 12/1986 |
| WO | 0165272 A1 | 9/2001 |

OTHER PUBLICATIONS

French Search Report and Written Opinion for Application No. 2001404, dated Nov. 4, 2020, 8 pages (French).

*Primary Examiner* — Fekadeselassie Girma
(74) *Attorney, Agent, or Firm* — RatnerPrestia

(57) ABSTRACT

A corner sensor for a motor vehicle capable of communicating over a wireless communication link with an authentication device and including: an array of antennae; and an electronic control unit configured to: determine the phase difference between the segments received by the antennae; determine the probability of each angle of incidence over a range of angles that is predetermined on the basis of the determined phase differences and of a predefined table, so as to determine a probability profile; measure the power of the segments received by the antennae of the array of antennae so as to determine a power profile; determine the actual angle of incidence of the signal by multiplying the probability profile with the power profile; and send the value of the determined actual angle of incidence to a central electronic control unit of the vehicle.

13 Claims, 3 Drawing Sheets

(56) References Cited

U.S. PATENT DOCUMENTS

| | | | | |
|---|---|---|---|---|
| 6,611,226 B1* | 8/2003 | Jones | ............... | G01S 13/68 |
| | | | | 342/160 |
| 6,989,789 B2* | 1/2006 | Ferreol | ............... | G01S 3/48 |
| | | | | 342/440 |
| 7,864,898 B2* | 1/2011 | Jia | ............... | G01S 19/30 |
| | | | | 375/150 |
| 11,175,375 B2* | 11/2021 | Hill | ............... | G01S 5/02585 |
| 11,436,553 B2* | 9/2022 | Kirmani | ............... | G01G 19/005 |
| 11,501,244 B1* | 11/2022 | Hill | ............... | G06K 7/1413 |
| 2007/0001867 A1* | 1/2007 | Rowe | ............... | G01S 5/02 |
| | | | | 340/8.1 |
| 2009/0034603 A1* | 2/2009 | Lakdawala | ............... | H03K 7/10 |
| | | | | 375/238 |
| 2022/0413166 A1* | 12/2022 | Saccomanno | ............... | A23B 7/015 |

* cited by examiner

[Fig 1]
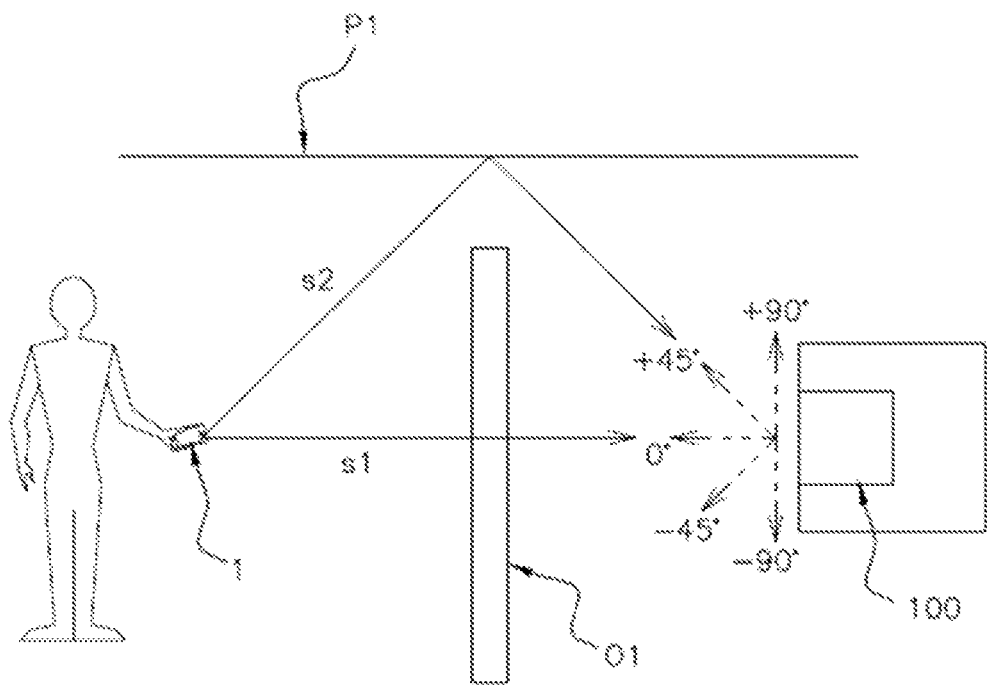
Prior Art
[Fig 2]
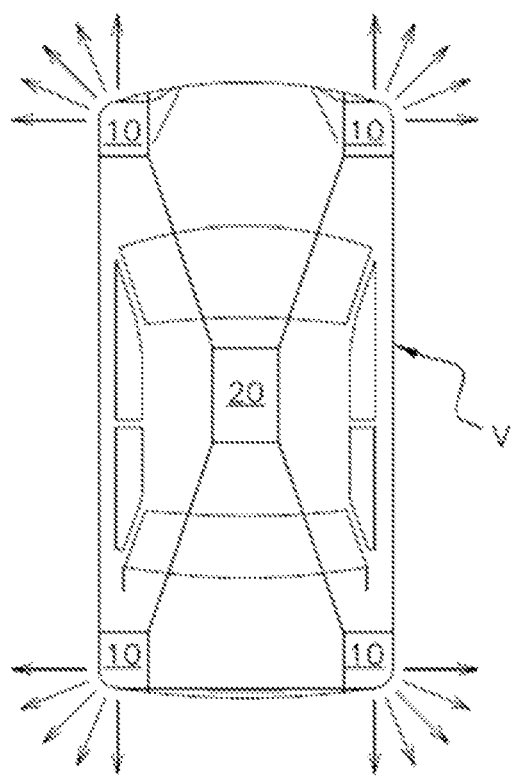

[Fig 3]
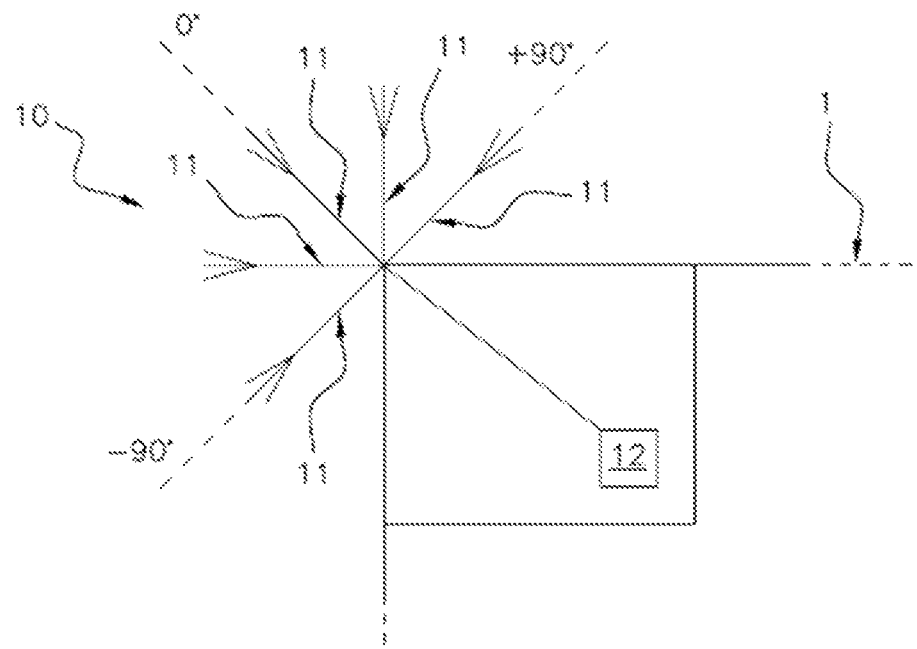
[Fig 4]
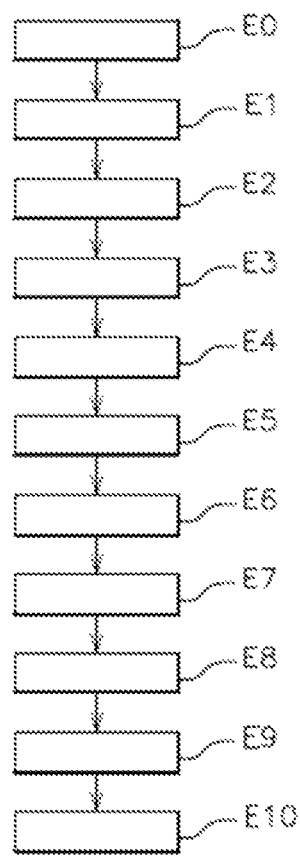

[Fig 5]
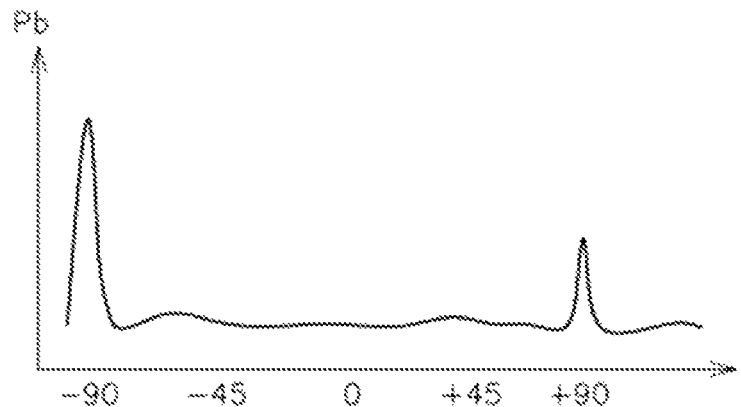
[Fig 6]
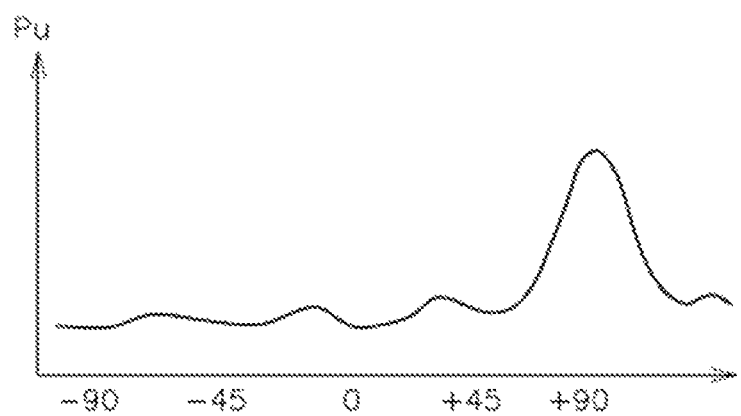
[Fig 7]
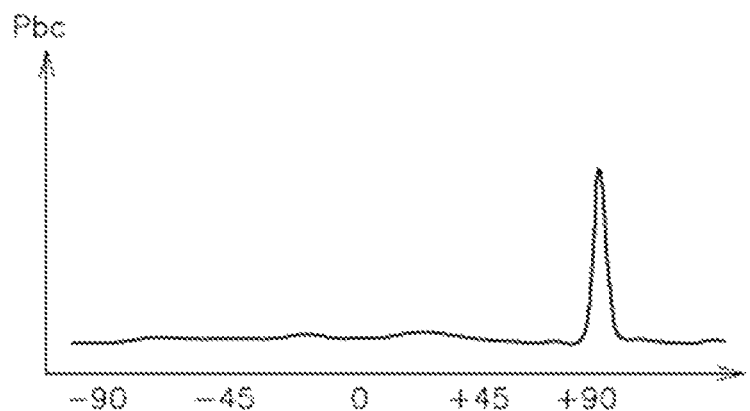

CORNER SENSOR FOR A MOTOR VEHICLE

CROSS REFERENCE TO RELATED APPLICATIONS

This application claims priority to French Patent Application No. 2001404, filed Feb. 13, 2020, the contents of such application being incorporated by reference herein.

TECHNICAL FIELD

Field of the Invention

The invention relates to the field of locating an authentication device around a motor vehicle and, more specifically, to a method and to a corner sensor for determining the location of an authentication device, in order to determine whether the device is located in a predetermined security zone around a motor vehicle in order to activate functions of said vehicle.

Background of the Invention

Currently, it is known for an authentication device to be used that allows remote activation of certain functions of a motor vehicle. This device can be, for example, in the form of a badge or of a smartphone carried by a user of the vehicle.

Thus, when the user approaches the vehicle and enters a predetermined zone, called "security zone", around said vehicle, the device and the vehicle exchange signals so that the vehicle authenticates the device and authorizes it to remotely activate certain functions. These functions can be, for example, the unlocking of the openings of the vehicle (doors, trunk, etc.) or the activation of the welcome functions (ambient lighting, seat adjustment, etc.).

In order to exchange signals with the device, the vehicle comprises a plurality of communication modules and a central electronic control unit (or ECU) connected to said modules.

In a known solution, the vehicle comprises corner sensors disposed at the four corners of the vehicle. The purpose of each sensor is to determine the angle of incidence, in other words the direction of arrival, of a signal sent by the device to said sensor and to transmit this information to the central electronic control unit. Thus, the central electronic control unit determines whether the device is located in the security zone, on the basis of the information transmitted by all the sensors.

In a known manner, the sensor comprises an array of directional antennae and an electronic control unit. The antennae are each oriented in a predetermined direction. Each antenna of the array therefore has a direction of radiation that is specific thereto and is configured to receive RadioFrequency (RF) signals transmitted by the device.

Therefore, the corner sensor receives RF signals via the array of antennae and the electronic control unit measures the phase shift between the signals received by the corner sensor in order to determine the angle of incidence of the signals transmitted by the device. To this end, the electronic control unit is particularly configured to implement a MUSIC ("Multiple Signal Classification") method that is known to a person skilled in the art.

In particular, in the event of the reflection of an RF signal transmitted by the device, the MUSIC method implemented by the electronic control unit proposes a probability for each angle of incidence value. Therefore, several angle of incidence values are possible and an angle of incidence value is selected by selecting the angle of incidence value with the highest probability.

However, the selected angle of incidence value may not be correct and may not correspond to the actual angle of incidence of the RF signal transmitted by the device. If the selected angle of incidence value is not correct, then the location of the device associated with this angle of incidence also will not be correct.

For example, with reference to FIG. 1, a device 1 is shown that has transmitted a first signal s1 and a second signal s2 to a corner sensor 100. The first signal s1 is sent in a straight direction from the device 1 to the corner sensor 100 and is attenuated, before being received by the corner sensor 100, due to an obstacle O1. The second signal s2 is reflected onto a wall P1 before being received by the corner sensor 100. Thus, the MUSIC method determines a first angle of incidence at 0°, corresponding to the first signal s1, and a second angle of incidence at 45°, corresponding to the second signal s2, and selects the angle of incidence at 45°, since it is this angle that corresponds to the least attenuated received signal. However, the selected angle of incidence does not represent the actual direction of the location of the device, which in this case corresponds to the angle of incidence at 0°.

Thus, since the device will be considered to be placed at a location that is different from its actual location, certain functions of the vehicle can be activated inappropriately.

Therefore, a requirement exists for a solution that at least partly addresses these disadvantages.

SUMMARY OF THE INVENTION

An aspect of the invention relates to a corner sensor for a motor vehicle, said corner sensor being capable of communicating over a wireless communication link with an authentication device carried by a user of said vehicle, said corner sensor comprising:

a. an array of antennae, each antenna of which is configured to be active for reception during a predetermined time range, called "reception" time range, that is different from the reception time ranges of the other antennae of the array of antennae, so as to receive a different portion, called "segment", of the same signal sent by the device via said wireless communication link;

b. an electronic control unit configured to:
  i. determine the phase difference between the segments received by the antennae of the array of antennae;
  ii. determine the probability of each angle of incidence over a range of angles that is predetermined on the basis of the determined phase differences and of a predefined table, so as to determine a probability profile over the predetermined range of angles;
  iii. measure the power of the segments received by the antennae of the array of antennae so as to determine a power profile over the predetermined range of angles;
  iv. determine the actual angle of incidence of the signal by multiplying the probability profile and said power profile;
  v. send the value of the determined actual angle of incidence to a central electronic control unit of the vehicle.

Thus, the corner sensor allows the actual angle of incidence of a received signal to be reliably determined by using the power profile of said signal.

Preferably, the electronic control unit is configured to determine the actual angle of incidence by selecting the value of the angle of incidence corresponding to the maximum of the result of the multiplication.

More preferably, the array of antennae comprises a plurality of directional antenna.

Advantageously, the corner sensor is capable of communicating with the device over a radiofrequency communication link.

An aspect of the invention also relates to a vehicle, in particular a motor vehicle, comprising a system for locating an authentication device carried by a user of said vehicle, said system comprising at least two corner sensors as previously described and a central electronic control unit.

Thus, the at least one sensor mounted in the vehicle allows the actual angle of incidence of a received signal to be reliably determined by using the power profile of said signal.

Preferably, the central electronic control unit is configured to:
a. receive a plurality of actual angle of incidence values, each value being determined and sent by a separate corner sensor;
b. determine the location of the authentication device on the basis of the plurality of received angle of incidence values.

Thus, the central electronic control unit allows the location of the authentication device to be reliably determined on the basis of the plurality of determined actual angle of incidence values. Furthermore, depending on the position of the device and of the one or more security zones of the vehicle, the central electronic control unit appropriately activates one or more of the functions of the vehicle.

An aspect of the invention also relates to a method for locating an authentication device for a vehicle, in particular a motor vehicle, said vehicle, which is a vehicle as previously described, comprising a location system, the method being characterized in that it comprises the following steps:
a. receiving, by at least two corner sensors, at least one signal sent by the authentication device;
b. for each corner sensor having received at least one signal:
  i. determining the phase difference between the segments received by the antennae of the array of antennae;
  ii. determining the probability of each angle of incidence over a predetermined range of angles on the basis of the determined phase differences and of a predefined table, so as to determine a probability profile over the predetermined range of angles;
  iii. measuring the power of the segments received by the antennae of the array of antenna so as to determine a power profile over the predetermined range of angles;
  iv. determining the actual angle of incidence of the signal by multiplying the probability profile and said power profile;
  v. sending the value of the determined actual angle of incidence to a central electronic control unit of the vehicle.

Advantageously, the actual angle of incidence is determined by selecting the value of the angle of incidence corresponding to the maximum of the result of the multiplication.

Preferably, the method comprises, after the step of sending the value of the actual angle of incidence, the following steps:
a. receiving a plurality of actual angle of incidence values, each value being determined and sent by a separate corner sensor;
b. determining the location of the authentication device on the basis of the plurality of received angle of incidence values.

More preferably, the method, as previously described, comprises, before the step of determining the phase difference between the segments received by the antennae, a step of determining the phase of each received signal segment.

DESCRIPTION OF THE FIGURES

Further features and advantages of aspects of the invention will become more clearly apparent from reading the following description This description is purely illustrative and should be read with reference to the appended drawings, in which:

FIG. 1 schematically illustrates an embodiment of a corner sensor according to the prior art;

FIG. 2 schematically illustrates an embodiment of the vehicle according to the invention;

FIG. 3 schematically illustrates an embodiment of a corner sensor according to the invention;

FIG. 4 illustrates an embodiment of the method according to the invention;

FIG. 5 illustrates a graph of the probability profile over a predetermined range of angles according to an aspect of the invention;

FIG. 6 illustrates a graph of the power profile over the predetermined range of angles according to an aspect of the invention;

FIG. 7 illustrates the result of the multiplication of the probability profile of FIG. 4 and the power profile of FIG. 5 according to an aspect of the invention.

DETAILED DESCRIPTION OF AT LEAST ONE EMBODIMENT

Vehicle

A vehicle according to an aspect of the invention will be described with reference to FIG. 2.

The vehicle V comprises a system for remotely locating an authentication device 1 carried by a user of said vehicle V.

Authentication Device

Such an authentication device 1 can be, for example, in the form of a badge, an electronic contact key or a smartphone, in order to allow the user to be authenticated with the vehicle V in order to implement certain functions.

The device is configured to send a plurality of signals, in particular radiofrequency signals, toward the vehicle V.

Location System

The location system can be particularly used in order to implement a function of the vehicle, for example, a lighting function of the vehicle V or even a function for unlocking the openings of the vehicle V (doors or trunk).

For security reasons, it is known for the location system to be configured to activate said functions only when the user, and therefore the device carried by the user, is located in a zone, called "security zone", around the vehicle V. For example, the security zone is defined for a distance of less than two meters from the vehicle V. The distance to the vehicle V particularly depends on the function to be activated.

The location system comprises a plurality of corner sensors 10 and a central electronic control unit 20.

For example, still with reference to FIG. 2, the location system comprises four identical corner sensors, with each corner sensor 10 being mounted at a corner of the vehicle V (front right-hand corner, front left-hand corner, rear right-hand corner, rear left-hand corner of the vehicle) in order to optimize the location of a device located around the vehicle V.

According to another embodiment, two additional corner sensors 10 are mounted in the vehicle V, with each additional corner sensor 10 being mounted on a side of the vehicle V, for example, in the rear right-hand door and in the rear left-hand door of the vehicle V.

The central electronic control unit 20 is connected to each corner sensor 10 of the plurality of corner sensors 10.

Corner Sensor 10 (FIG. 3)

In order to simplify the description, a single corner sensor 10 will be shown with reference to FIG. 3, since the corner sensors 10 of the plurality of corner sensors 10 are identical to each other.

The corner sensor 10 is capable of communicating over a wireless communication link with the authentication device, in particular over a radiofrequency communication link.

The corner sensor 10 comprises an array of antennae 11 and an electronic control unit 12.

Array of Antennae 11

The array of antennae 11 comprises at least two antennae 11.

The antennae 11 of the array of antennae 11 are directional. Thus, each antenna 11 mainly radiates in a particular direction.

The antennae 11 are disposed so that the direction of radiation of each antenna 11 is defined in the longitudinal plane of the vehicle V, toward the outside of the vehicle V.

Preferably, each antenna 11 has a direction of radiation that is selected over a predetermined range of angles, for example, defined between −100 and 100 degrees. Furthermore, the bisecting line of the range of angles can be located in the diagonal of the vehicle V, viewed from above or in a lateral plane of the vehicle V.

In particular, the antennae 11 are mounted in the corner sensor 10 so that the directions of radiation of the antennae 11 are substantially distributed at regular intervals over the predetermined range of angles.

For example, still with reference to FIG. 3, the array of antennae 11 comprises five directional antennae 11. The first antenna 11 radiates at −90° over the predetermined range of angles, the second antenna 11 radiates at −45°, the third antenna 11 radiates at 0°, the fourth antenna 11 radiates at 45° and the fifth antenna 11 radiates at +90°.

Each array of antennae 11 is configured to receive at least one signal of the plurality of RF signals sent by the authentication device, via said wireless communication link. In particular, each antenna 11 of the array of antennae 11 is configured to be active for reception during a predetermined time range, called "reception time range", that is different from the reception time ranges of the other antenna of the array of antennae 11, so as to receive a different portion, called "segment", of the same signal. Thus, each signal segment received by an antenna 11 can be associated with said antenna 11.

Electronic Control Unit 12

The electronic control unit 12 particularly comprises a module for selecting antennae.

Still with reference to FIG. 3, the module for selecting antennae is connected to each antenna 11 of the array of antennae 11 via a communication link, for example, via a CAN ("Controller Area Network") communication bus, a LIN ("Local Interconnect Network") communication bus or an Ethernet cable.

In other words, the electronic control unit 12 is connected to each antenna 11 of the array of antennae 11 via the module for selecting antennae.

Thus, the module for selecting antennae is configured to activate each antenna 11 of the array of antennae 11 for reception, during a predetermined reception time range, so that each antenna 11 can receive a signal segment.

In other words, the module for selecting antennae is configured to activate the antennae 11 of the array of antennae 11 one by one, whilst keeping the other antennae 11 deactivated.

When an antenna 11 is active, it thus can receive an RF signal segment sent by the authentication device. It is also possible for one or more antennae 11 of the array of antennae 11 not to receive a segment of a signal sent by the authentication device 1.

The electronic control unit 12 is thus configured to receive at least two segments of a signal, in particular an RF signal, via the array of antennae 11. Each signal segment is associated with the antenna 11 of the array of antennae 11 that received said signal segment.

For at least two segments of a signal transmitted by the authentication device 1 that are received by at least two separate antennae 11 of the array of antennae 11, the electronic control unit 12 is configured to determine the phase of each received signal segment.

The phase is particularly determined on the basis of the imaginary part of each received segment.

The electronic control unit 12 is also configured to determine the phase difference between the segments of the signal, received by the antennae 11 of the array of antennae 11 on the basis of the determined phases. The electronic control unit 12 thus obtains a combination of phase differences.

Subsequently, the electronic control unit 12 is configured to determine the probability of each angle of incidence defined over the predetermined range of angles on the basis of the determined phase differences and of a predefined table. In other words, the electronic control unit 12 is configured to determine a probability profile over the predetermined range of angles.

The predefined table comprises a match between each angle of the predetermined range of angles and the probability of said angle, as a function of the combination of phase differences. In other words, each angle value of the predetermined range of angles is associated with a set of probability values of said angle value. Each of said probability values corresponds to a combination of phase differences; therefore, a combination of phase differences is associated with each probability value in the predefined table.

To this end, the electronic control unit 12 is, for example, configured to implement the MUSIC ("MUltiple SIgnal Classification") method that is known as such to a person skilled in the art.

Furthermore, the electronic control unit 12 is configured to measure the power of each signal segment received by the antennae 11 of the array of antennae 11, so as to determine a power profile over the predetermined range of angles. In other words, since each received signal segment is associated with an antenna 11, which is associated with a direction of radiation and with an angle of incidence, the measured power of each received signal segment is also associated with said angle of incidence. Thus, with each power measurement being associated with an angle of incidence, the electronic control unit 12 can easily determine the power profile, in other words, the variation of power of a received signal segment, as a function of the angle of incidence of said signal, with a value that is within the range of angles.

In practice, in order to measure the power of an RF signal segment, the electronic control unit 12 measures the actual part of the RF signal segment.

The electronic control unit 12 is also configured to determine the actual angle of incidence of the signal, corresponding to the actual direction in which the device 1 is located.

To this end, the electronic control unit 12 is configured to correct the probability profile, by multiplying said probability profile by said determined power profile. The actual angle of incidence corresponds to the value of the angle of incidence, corresponding to the maximum of the corrected probability profile.

The electronic control unit 12 is subsequently configured to send the value of the determined actual angle of incidence to the central electronic control unit 20 of the vehicle V.

Central Electronic Control Unit 20

The central electronic control unit 20 is mounted in the vehicle V and is connected to the plurality of corner sensors 10, in particular via a communication link, for example, a wired link.

For example, the central electronic control unit 20 is connected to the plurality of corner sensors 10 via a CAN ("Controller Area Network") communication bus, a LIN ("Local Interconnect Network") communication bus or an Ethernet cable, known as such to a person skilled in the art.

The central electronic control unit 20 is configured to receive at least two actual angle of incidence values, each actual angle of incidence value being determined and sent by a separate corner sensor 10.

The central electronic control unit 20 is configured to determine the location of the device 1, on the basis of the plurality of received angle of incidence values.

In particular, the electronic control unit 20 is configured to determine the location of the authentication device 1 using a triangulation method, since each received actual angle of incidence allows the actual direction of the device 1 to be given in relation to the corner sensor 10 that sent the angle of incidence value to the central electronic control unit 20.

Finally, on the basis of the determined location, the central electronic control unit 20 is configured to determine whether the device 1 is located in the security zone of one or more functions of the vehicle V.

Thus, the central electronic control unit 20 is configured to determine whether the one or more functions of the vehicle V associated with the one or more zones in which the device 1 is located need to be activated.

Method

With reference to FIG. 4, an embodiment of the method will now be described that is implemented by the location system as previously described, particularly comprising four corner sensors 10, each comprising five antennae 11.

Sending Step E0

The method firstly comprises a step E0 whereby the authentication device 1 sends a plurality of RF signals toward the vehicle V.

Reception Step E1

The method subsequently comprises a step E1 of receiving, by at least two corner sensors 10, a sent RF signal via the array of antennae 11. Since the corner sensors 10 are identical and operate in the same way, the reception of an RF signal by one of the corner sensors 10 will only be described herein.

Thus, the following steps of the method are repeated for each corner sensor 10 receiving the RF signal.

More specifically, when the array of antennae 11 of a corner sensor 10 receives an RF signal, this means that at least two antennae 11 of the array of antennae 11 receive a segment of the sent RF signal. Each antenna 11 can receive a signal segment when it is activated, by the antenna selection module, over the predetermined reception time range that is specific thereto.

According to the example provided herein, for a signal sent by the authentication device 1, the first antenna 11 and the fifth antenna 11 receive a segment of the RF signal sent by the device 1.

Step E2 of Determining the Phase

The method subsequently comprises a step E2 of the electronic control unit 12 determining the phase of each signal segment received by an antenna 11 of the array of antennae 11.

The phase of the segments can be determined directly after the segment is received by an antenna 11 or once all the segments have been received by the array of antennae 11.

Step E3 of Determining the Phase Difference

The method subsequently comprises a step E3 of determining the phase difference between the segments received by the antennae 11 of the array of antennae 11. The phase difference is determined by the electronic control unit 12 of the corner sensor 10 that received the segments of the signal, on the basis of the imaginary part of each received RF signal segment. Thus, at the end of the determination step E3, the electronic control unit 12 determines a combination of phase differences.

According to the example provided herein, a single phase difference is determined between the phase of the segment received by the first antenna 11 and the phase of the segment received by the fifth antenna 11. The combination of phase differences therefore comprises a phase difference.

Step E4 of Determining the Probability of Each Angle of Incidence

The method subsequently comprises a step E4 of determining the probability of each angle of incidence over the predetermined range of angles on the basis of the combination of determined phase differences and of the predefined table. In other words, the electronic control unit 12 selects, from the predefined table and for each angle of the predetermined range of angles, the probability of said angle corresponding to the combination of determined phase differences. The probability profile $P_b$ over the range of angles is then determined.

Furthermore, the probability of each angle of incidence is determined by the electronic control unit 12, in particular by implementing the MUSIC method.

According to the example provided herein, FIG. 5 shows the probability profile $P_b$, corresponding to the previously determined combination of phase differences on the basis of the segments received by the first antenna 11 and the fifth antenna 11. According to this example, two angles of incidence, −90 and +90 degrees, have the highest probabilities.

Measuring Step E5

In the event that the probability profile $P_b$ comprises a high probability for at least two angles of incidence, the method comprises a measurement step E5. During the measurement step E5 the electronic control unit 12 measures the power of the received segments so as to determine a power profile over the predetermined range of angles. The power of a segment is measured on the basis of the actual part of the segment.

For example, FIG. 6 shows a power profile $P_u$ measured over the predetermined range of angles. The profile shows that the measured power is highest around the angle of incidence of 90°.

The measurement step E5 obviously can be carried out at any time, between the reception step E1 and the determination step E4.

Step E6 of Determining the Actual Angle of Incidence

Subsequently, after having determined the power profile $P_u$ and the probability profile $P_b$ over the predetermined range of angles, the method comprises a step E6 of determining the actual angle of incidence.

To this end, the electronic control unit 12 corrects the probability profile $P_b$ by multiplying the power profile $P_u$ with the probability profile $P_b$ over the range of angles. The electronic control unit 12 therefore in this case determines a corrected probability profile $P_{bc}$.

For example, FIG. 7 shows the corrected probability profile $P_{bc}$ corresponding to the result of the multiplication of the probability profile $P_b$ of FIG. 5 with the power profile $P_u$ of FIG. 6.

Subsequently, the electronic control unit 12 determines the actual angle of incidence by selecting the value of the angle of incidence, corresponding to the maximum of the corrected probability profile $P_{bc}$.

According to the example shown herein, the actual angle of incidence is the angle at +90°.

Sending Step E7

The method subsequently comprises a step E7 whereby the electronic control unit 12 sends the determined actual angle of incidence value to the central electronic control unit 20.

Reception Step E8

Therefore, the method also comprises a step E8 of the central electronic control unit 20 receiving the sent actual angle of incidence value.

Location Step E9

When the central electronic control unit 20 receives a plurality of angle of incidence values, with each value being sent by a separate corner sensor 10, the method comprises a step E9 of locating the device 1. The location step E9 is carried out by the central electronic control unit 20 on the basis of the plurality of received angle of incidence values and by a triangulation method.

Activation Step E10

Finally, the method comprises a step E10 of activating at least one function of the vehicle V, if the device 1 is located in a security zone of at least one function of the vehicle V. In particular, the central electronic control unit 20 compares the location of the device with the security zone of each function.

Thus, the method and the location system allow the actual angle of incidence between the device 1 and each corner sensor 10 to be reliably determined. Similarly, the location of the device 1 is reliably determined on the basis of the plurality of determined actual angles of incidence. Thus, the central electronic control unit 20 appropriately activates one or more functions of the vehicle V.

The invention claimed is:

1. A corner sensor for a motor vehicle, said corner sensor being capable of communicating over a wireless communication link with an authentication device carried by a user of said vehicle, said corner sensor comprising:
    i. an array of antennae, each antenna of which is configured to be active for reception during a predetermined time range, called "reception" time range, that is different from the reception time ranges of the other antennae of the array of antennae, so as to receive a different portion, called "segment", of the same signal sent by the device via said wireless communication link;
    ii. an electronic control unit configured to:
        1. determine the phase difference between the segments received by the antennae of the array of antennae;
        2. determine a probability of each angle of incidence over a predetermined range of angles on the basis of the determined phase differences and of a predefined table, so as to determine a probability profile ($P_b$) over the predetermined range of angles;
        3. measure a power of the segments received by the antennae of the array of antennae so as to determine a power profile ($P_u$) over the predetermined range of angles;
        4. determine an actual angle of incidence of the signal by multiplying the probability profile ($P_b$) with said power profile ($P_u$);
        5. send a value of the determined actual angle of incidence to a central electronic control unit of the vehicle.

2. The corner sensor as claimed in claim 1, wherein the electronic control unit is configured to determine the actual angle of incidence by selecting the value of the angle of incidence corresponding to the maximum of the result of the multiplication.

3. The corner sensor as claimed in claim 1, wherein the array of antennae comprises a plurality of directional antennae.

4. The corner sensor as claimed in claim 1, capable of communicating with the device over a radiofrequency communication link.

5. The corner sensor as claimed in claim 2, wherein the array of antennae comprises a plurality of directional antennae.

6. A vehicle comprising a system for locating an authentication device carried by a user of said vehicle, said system comprising at least two corner sensors as claimed in claim 1 and a central electronic control unit.

7. The vehicle as claimed in claim 6, wherein the central electronic control unit is configured to:
    a. receive a plurality of actual angle of incidence values, each value being determined and sent by a separate corner sensor;
    b. determine a location of the authentication device on the basis of the plurality of received angle of incidence values.

8. A method for locating an authentication device for a vehicle, said vehicle, which is a vehicle as claimed in claim 5, comprising a location system, the method comprising:
    a. receiving, by at least two corner sensors, at least one signal sent by the authentication device;
    b. for each corner sensor having received at least one signal:
        i. determining the phase difference between the segments received by the antennae of the array of antennae;
        ii. determining the probability of each angle of incidence over a predetermined range of angles on the basis of the determined phase differences and of a predefined table, so as to determine a probability profile ($P_b$) over the predetermined range of angles;
        iii. measuring the power of the segments received by the antennae of the array of antenna so as to determine a power profile ($P_u$) over the predetermined range of angles;

iv. determining the actual angle of incidence of the signal by multiplying the probability profile ($P_b$) with said power profile ($P_u$);
v. sending the value of the determined actual angle of incidence to a central electronic control unit of the vehicle.

9. The method as claimed in claim 8, wherein the actual angle of incidence is determined by selecting the value of the angle of incidence corresponding to the maximum of the result of the multiplication.

10. The method as claimed in claim 9, comprising, after the step of sending the value of the actual angle of incidence, the following:
   a. receiving a plurality of actual angle of incidence values, each value being determined and sent by a separate corner sensor;
   b. determining the location of the authentication device on the basis of the plurality of received angle of incidence values.

11. The method as claimed in claim 7, comprising, after the step of sending the value of the actual angle of incidence, the following:
   a. receiving a plurality of actual angle of incidence values, each value being determined and sent by a separate corner sensor;
   b. determining the location of the authentication device on the basis of the plurality of received angle of incidence values.

12. The method as claimed in claim 8, comprising, before the step of determining the phase difference between the segments received by the antennae, a step of determining the phase of each received signal segment.

13. A method for locating an authentication device for a vehicle, said vehicle, which is a vehicle as claimed in claim 6, comprising a location system, the method comprising:
   a. receiving, by at least two corner sensors, at least one signal sent by the authentication device;
   b. for each corner sensor having received at least one signal:
      i. determining the phase difference between the segments received by the antennae of the array of antennae;
      ii. determining the probability of each angle of incidence over a predetermined range of angles on the basis of the determined phase differences and of a predefined table, so as to determine a probability profile over the predetermined range of angles;
      iii. measuring the power of the segments received by the antennae of the array of antenna so as to determine a power profile over the predetermined range of angles;
      iv. determining the actual angle of incidence of the signal by multiplying the probability profile with said power profile;
      v. sending the value of the determined actual angle of incidence to a central electronic control unit of the vehicle.

* * * * *